United States Patent
Kalligeros et al.

(10) Patent No.: US 11,951,845 B2
(45) Date of Patent: Apr. 9, 2024

(54) MOBILE APPARATUS AND ENERGY SYSTEM

(71) Applicant: PUSHME BIKES LIMITED, London (GB)

(72) Inventors: Georgios Kalligeros, London (GB); Christos Grivas, Athens (GR)

(73) Assignee: PUSHME BIKES LIMITED, London (GB)

( * ) Notice: Subject to any disclaimer, the term of this patent is extended or adjusted under 35 U.S.C. 154(b) by 559 days.

(21) Appl. No.: 17/271,669

(22) PCT Filed: Aug. 30, 2019

(86) PCT No.: PCT/GB2019/052420
§ 371 (c)(1),
(2) Date: Feb. 26, 2021

(87) PCT Pub. No.: WO2020/044054
PCT Pub. Date: Mar. 5, 2020

(65) Prior Publication Data
US 2021/0316633 A1    Oct. 14, 2021

(30) Foreign Application Priority Data
Aug. 31, 2018  (GB) .................................. 1814206

(51) Int. Cl.
*B60L 53/65* (2019.01)
*B60L 3/12* (2006.01)
(Continued)

(52) U.S. Cl.
CPC .............. *B60L 3/12* (2013.01); *B60L 53/305* (2019.02); *B60L 53/65* (2019.02); *B60L 53/68* (2019.02);
(Continued)

(58) Field of Classification Search
CPC ... B62H 5/001; B62H 2003/005; B60L 53/62; B60L 53/68; B60L 53/80; B60L 50/66;
(Continued)

(56) References Cited

U.S. PATENT DOCUMENTS 8,560,147 B2   10/2013 Taylor et al.
9,424,697 B2    8/2016 Wu et al.
(Continued)

FOREIGN PATENT DOCUMENTS

CN   103875149   6/2014
CN   105947030   9/2016
(Continued)

OTHER PUBLICATIONS

Yaqub, Defending Unethical-unplugging of an EV-charging Cable (DUEC), 2018, IEEE, p. 1-7 (Year: 2018).*
(Continued)

*Primary Examiner* — McDieunel Marc
(74) *Attorney, Agent, or Firm* — Dicke, Billig & Czaja, PLLC

(57) ABSTRACT

There is provided a method and apparatus for requesting a battery to be unlocked from an e-vehicle using an application for authorizing a user to unlock the battery. A request is received at a cloud-based server, to unlock the battery from the micro mobility vehicle. Authorisation data is provided, by the cloud-based server, if the user making the request is permitted to unlock the battery at the e-vehicle. Further, methods and apparatus for controlling a self-serviced battery swap station by a cloud-based server are described. In one example battery data may be obtained from a cloud-connected battery swap station and used to generate battery charging control data. In one example, the battery charging control data is sent to the battery swap station.

17 Claims, 7 Drawing Sheets

(51) Int. Cl.
  *B60L 53/30* (2019.01)
  *B60L 53/68* (2019.01)
  *B60L 53/80* (2019.01)
  *B62J 43/10* (2020.01)
  *B62J 43/23* (2020.01)
  *B62K 3/00* (2006.01)
  *B60L 58/13* (2019.01)
  *B60L 58/16* (2019.01)

(52) U.S. Cl.
  CPC ............ *B60L 53/80* (2019.02); *B62J 43/10* (2020.02); *B62J 43/23* (2020.02); *B62K 3/002* (2013.01); *B60L 58/13* (2019.02); *B60L 58/16* (2019.02); *B60L 2270/36* (2013.01)

(58) Field of Classification Search
  CPC .......... B60L 3/12; B60L 53/305; B60L 50/20; B60L 53/65; B60L 58/12; B60L 50/60; B60L 53/665; B60L 2240/72; B60L 2240/62; B60L 2200/24; B60L 2270/36; B60L 2200/12; B60L 2250/20; B60L 58/16; B60L 2240/545; B60L 2270/34; B60L 58/13; B62K 3/002; B62K 2204/00; B62J 43/10; B62M 6/90; Y02T 90/167; Y02T 10/70; Y02T 90/16; Y02T 90/12; Y02T 10/7072; Y02T 10/72; Y04S 30/14
  See application file for complete search history.

(56) References Cited

U.S. PATENT DOCUMENTS

| | | | |
|---|---|---|---|
| 10,286,802 B2 | 5/2019 | Kim | |
| 11,215,981 B2* | 1/2022 | VanderZanden | G05D 1/0291 |
| 11,235,838 B2* | 2/2022 | Heinemann | B62M 6/50 |
| 11,745,816 B2* | 9/2023 | Treadway | H04N 7/18 |
| | | | 180/220 |
| 2010/0228405 A1* | 9/2010 | Morgal | B62H 3/00 |
| | | | 701/1 |
| 2015/0197154 A1 | 7/2015 | Jones et al. | |
| 2015/0306967 A1 | 10/2015 | Cohen | |
| 2016/0145903 A1 | 5/2016 | Taylor et al. | |
| 2016/0368464 A1 | 12/2016 | Hassounah | |
| 2017/0091042 A1 | 3/2017 | Sheng et al. | |
| 2019/0324446 A1* | 10/2019 | VanderZanden | G05D 1/0291 |

FOREIGN PATENT DOCUMENTS

| | | |
|---|---|---|
| CN | 106184122 | 12/2016 |
| CN | 107031440 | 8/2017 |
| CN | 206 513 139 | 9/2017 |
| CN | 107244245 | 10/2017 |
| CN | 107610277 | 1/2018 |
| CN | 107 651 052 | 2/2018 |
| CN | 207 092 741 | 3/2018 |
| CN | 107818613 | 3/2018 |
| CN | 207216708 | 4/2018 |
| CN | 108202608 | 6/2018 |
| CN | 108437932 | 8/2018 |
| CN | 112959917 | 6/2021 |
| EP | 0985596 | 3/2000 |
| EP | 2639144 | 9/2013 |
| EP | 2737597 | 6/2014 |
| FR | 2 741 585 | 5/1997 |
| JP | 2006327581 | 12/2006 |
| JP | 2008267068 | 11/2008 |
| JP | 2011063074 | 3/2011 |
| WO | 2010/004192 | 1/2010 |
| WO | 2013/016559 | 1/2013 |
| WO | 2013/024483 | 2/2013 |
| WO | 2018/104965 | 6/2018 |
| WO | 2018/104966 | 6/2018 |

OTHER PUBLICATIONS

Hernández et al., iSHARE—Car sharing concept vehicle, 2013, IEEE, p. 1-8 (Year: 2013).*
Knight et al., Lock Picking in the Era of Internet of Things, 2019, IEEE, pg. (Year: 2019).*
Vidhyotma et al., Bluetooth Enabled Anti-Theft System Using Android Based Handheld Device, 2019, IEEE, p. 1-4 (Year: 2019).*
Written Opinion and Search Report dated Jan. 23, 2020 of International Application No. PCT/GB2019/052420.

* cited by examiner

MOBILE APPARATUS AND ENERGY SYSTEM

FIELD OF INVENTION

The present invention relates to energy systems for electric vehicles and in particular but not exclusively to a networked battery sharing system for micro-mobility electric vehicles.

BACKGROUND

Over the past 5 years there has been a modal shift in urban transport with dock-less shareable bicycles starting from China and spreading across the world, to UBER recently acquiring JUMP bikes (dock-less shareable electric bicycles), the launch of bird.co's shareable scooters and many more. What is being seen is the rise of platforms that offer shareable, last mile transport vehicles, an increasing number of which are electric.

Over the next 30 years, inner city transport is likely to change in 3 ways: 1) the annual mileage of last mile transport vehicles will increase by 10× (due to increase in traffic+urbanization, cars will become very inefficient) 2) people stop owning vehicles/vehicles become shareable/transport becomes a utility 3) all transportation is being electrified 4) vehicle form factor is becoming smaller and more space efficient. A few key players operating large fleets of small, electric, shareable vehicles that along with public transport and autonomous vehicles will move the majority of city goods and commuters.

SUMMARY

In an aspect of the invention, there is provided a cloud-connectable e-vehicle comprising a holster for receiving a battery, locking means for locking and unlocking the battery at the holster. The locking means is arranged to unlock the battery using an application for authorizing a permitted user to unlock the battery.

The application may be configured to cause authorization data for unlocking the battery to be communicated to the vehicle. The authorization data may be obtained using a cloud-based service. Obtaining the authorization data may also include authenticating a user at the cloud-based service.

The device on which the application is running may communicate the authorization data to the e-vehicle.

The e-vehicle may further comprise wireless communication means. The e-vehicle may be arranged to receive the authorization data from a cloud-based service via the wireless communication means.

The wireless communication means may include at least one of a GSM, 3G, 4G, LTE, 5G, or Bluetooth transceiver module.

The e-vehicle may be a micro-mobility vehicle. For example, an e-scooter or an e-bicycle.

In another aspect of the invention, there is provided a system comprising a cloud-server and one or more e-vehicles according to any of the above examples. The cloud-server is configured to provide authorization data for unlocking a battery of one of said e-vehicles in response to a request from an application.

The request may be from an application running on a portable device and includes data identifying a user. The request may include data identifying a component of an e-vehicle from which a user requests unlocking of a battery.

The system may further comprise user equipment running the application, said user equipment being communicatively coupled to the cloud-server.

In another aspect of the invention, there is provided a method comprising requesting a battery to be unlocked from an e-vehicle using an application for authorizing a user to unlock the battery, receiving, at a cloud-based server, the request to unlock the battery from the e-vehicle, and providing, by the cloud-based server, authorization data if the user making the request is permitted to unlock the battery at the e-vehicle. In an example, the authorization data may be a request issued by the network server to the e-vehicle to unlock the battery. The request may be generated in response to a request by an authenticated user who is authorised to unlock the battery.

The application may be running on a portable device. For example, user equipment such as a smart phone or tablet.

The request may include data identifying the user and the micro-mobility vehicle from which the battery is to be unlocked.

In a further aspect of the invention, there is provided a network server comprising one or more processors configured to receive a request to unlock a battery locked to an e-vehicle; determining if a user is permitted to unlock the battery from the e-vehicle; and provide authorization data if the user making the request is authorised to unlock the battery at the e-vehicle. In an example, the authorization data may be a request issued by the network server to the e-vehicle to unlock the battery. The request may be generated in response to a request by an authenticated user who is authorised to unlock the battery.

In a further aspect of the invention, there is provided, a method for controlling a self-serviced battery swap station by a cloud-based server comprising: obtaining battery data from a cloud-connected battery swap station; using the obtained battery data to generate battery charging control data; sending the battery charging control data to the battery swap station.

The charging control data may relate to a rate of charge.

The battery data may include usage data relating to the use of the battery swap station for charging batteries.

The method may further comprise estimating a measure of demand for charging at the battery swap station based on the usage data and setting the rate of charge according to the estimated demand.

The rate of charge may be set to a first value when the estimated measure of demand is higher than a threshold and a second value when lower than the threshold, and wherein the first value is higher than the second value.

The battery data may include a measure relating to battery health of an individual battery.

The charging control data may include data for controlling the charge rate of the individual battery.

The measure relating to battery health may be at least one of a state of battery charge, state of battery health, extreme battery behaviour event data, rate of discharge data, temperature data, frequency or number of charges.

The measure relating to battery health may be obtained from a battery monitoring system of the battery.

The battery swap station may be a micro-mobility e-vehicle battery swap-station. The micro-mobility e-vehicle may be an e-scooter or e-bicycle. An e-scooter may have two or more wheels, for example, a three-wheel e-scooter. Further, such an e-bicycle may or may not have pedals.

The method may further comprise obtaining geolocation data of first and second swap stations and grouping the swap stations as a single swap station at the cloud-based server if the geolocation data indicates the swap stations are at a same location.

In a yet further aspect of the invention, there is provided a cloud-based apparatus comprising one or more processors and a memory configured to obtain battery data from a cloud-connected battery swap station, use the obtained battery data to generate battery charging control data, and send the battery charging control data to the battery swap station.

The charging control data may be a rate of charge.

The battery data may include usage data relating to the use of the battery swap station for charging batteries at the swap station.

The apparatus may be further configured to estimate a measure of demand for charging at the battery swap station based on the usage data and setting the rate of charge according to the estimate. The rate of charge may be set to a first value when the estimated demand is higher than a threshold and a second value when lower than the threshold, and wherein the first value is higher than the second value.

The battery data may include a measure relating to health of an individual battery. The charging control data may include data for controlling the charge rate of the individual battery. The measure relating to battery health may be at least one of a state of battery charge, state of battery health, extreme battery behaviour event data, rate of discharge data, temperature data, frequency or number of charges. The measure relating to battery health may be obtained from a battery monitoring system of a battery.

The battery swap station may be a micro-mobility e-vehicle battery swap-station. The micro-mobility e-vehicle may be an e-scooter or an e-bicycle.

The apparatus may be further configured to obtain geolocation data of first and second swap stations and grouping the swap stations as a single swap station if the geolocation data indicates the swap stations are at a same location.

In another aspect of the invention, there is provided a self-service battery swap station comprising docking means for docking and undocking a battery for charging, charging means for charging a docked battery, and wireless communication means for connecting to a cloud-based server. The wireless communication means is arranged to send battery data relating to one or more docked batteries to the cloud server and receive charging control data from the cloud server. The charging means is arranged to charge the battery according to the received control data.

The communication means may be configured to automatically connect to the cloud server. The communication means may comprise at least one of a GSM, 3G, 4G or 5G wireless telecommunications module.

The swap station may further comprise geolocation means for determining the geolocation of the swap station and wherein the communication means is arranged to transmit the geolocation data to the cloud server.

The battery swap station may be a micro-mobility e-vehicle battery swap station. The e-vehicle may be an e-scooter or an e-bicycle, for example.

In a further aspect of the invention, there is provided a system comprising the cloud-based apparatus and a plurality of cloud-connectable micro-mobility vehicle battery swap stations according to any example above.

In another aspect of the invention, there is provided a computer program comprising instructions which upon execution cause any of the above methods for controlling a self-serviced battery swap station by a cloud-based server to be performed. The computer program may be stored on a carrier. The carrier may be a computer-readable carrier medium and be transitory or non-transitory.

According to yet another aspect of the invention there is provided a system, comprising a network comprising multiple self-serviced battery swap stations; and a cloud-based apparatus to receive data representing system events including (un)docking of a battery from a battery swap station, state of battery charge updates, state of battery health updates, and extreme battery behaviour events.

The above embodiments have advantages that include the plug-and-play nature of the Pushpod (battery swap station); a modular, cloud-connected battery charger that can be shipping through the post and only requires access to power to automatically connect and operate as a node in a centrally controlled energy network.

According to a yet further aspect of the invention there is provided a cloud-connected battery configured to de-dock from a swap station using an application to authenticate a user permitted to receive the battery.

A cloud-connected, self-unlocking battery is advantageous. Authenticating access to batteries in shareable vehicles is key. Currently operations teams carry manual, mechanical keys. If we are to allow anyone to remove the battery from the scooter while keeping track of who has access to it, and we want to use a mobile app to do this, the battery lock needs to be internet-activated.

BRIEF DESCRIPTION OF THE DRAWINGS

Various features and advantages of certain examples will be apparent from the detailed description which follows, taken in conjunction with the accompanying drawings, which together illustrate, by way of example, a number of features, and wherein.

DETAILED DESCRIPTION

Figure 1:
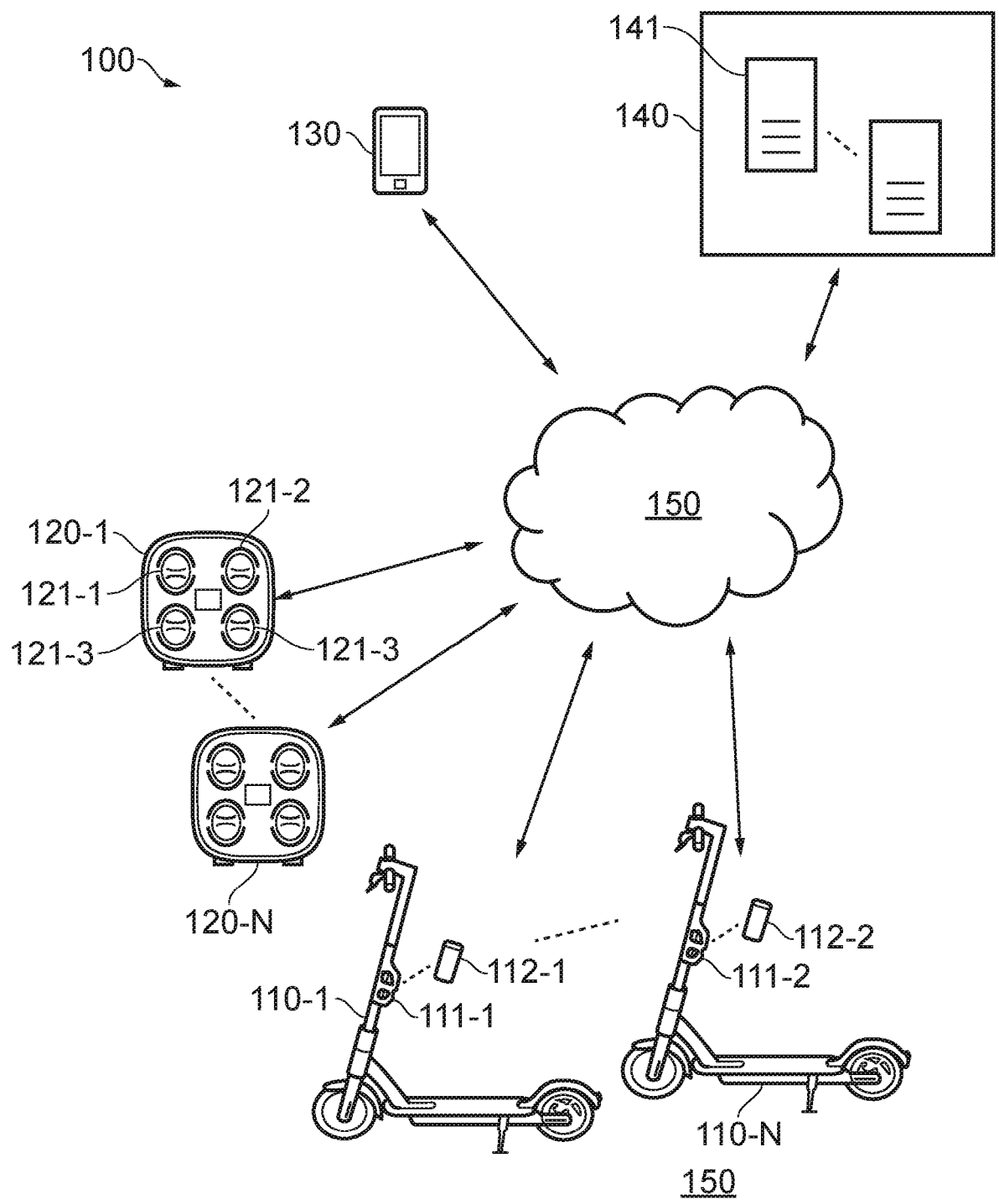
FIG. 1 is a block diagram of a system according to an embodiment.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

A key challenge—and the major cost—of operating shareable electric vehicles is maintaining vehicle charge. Currently operators operate 4 battery recharge models:

1. Operations teams remove vehicles off the street, charge in a warehouse
2. Incentivize users to drop-off vehicles at charging stations in central locations
3. Operations teams locate vehicles and swap depleted batteries for charged ones
4. Incentivize users to pick-up vehicles and charge them at home.

These models operate at a thin margin and operators are looking for ways to increase profitability. The existing charging options share 4 key costly elements: Operations teams, renting of prime real estate, vehicle downtime and charging hardware.

Option 1) is the least efficient, requiring large operations teams, warehouse space and vehicle downtime. Option 2) doesn't require ops teams but still requires prime real estate and vehicle downtime. Option 3) requires ops teams and warehouse to charge the batteries. Option 4) requires the company to provide chargers to users and have vehicle downtime. The core cost for all these options is the time taken/committed to carrying out the recharge which will have a cost implication. All of options 1)-4) will require significant time from the recharging parties.

The ideal scenario for an operator would be to provide users with access to instant recharge (no vehicle downtime) in the heart of downtown (users don't go out of their way), without requiring any charging hardware, renting prime real estate or requiring operations teams.

A solution, according to an example, comprises a network of self-serviced battery swap stations and shareable batteries. Battery swap stations may be placed inside publicly accessible prime real estate, like convenience stores. When users run low on battery, they may receive a notification on their mobile device and make their way to a nearing battery swap station (Pushpod), remove the depleted battery from their shareable e-vehicle, return the depleted battery to the Pushpod, pick-up a fully-charged battery (from the Pushpod) and slot it back into the shareable e-vehicle.

It requires no operations teams as it relies on the users to carry out the recharge; it incurs no vehicle downtime (swap is practically instant recharge); it doesn't require renting prime real estate; density of convenience store locations is very high so pay-out to users for swapping is minimal (not going out of their way); and charging hardware cost may be pushed onto the convenience stores.

Convenience stores are looking for ways to drive more traffic (footfall) in their shops and are willing to pay for it. The most significant incentive is that of footfall. For Paypoint, over 60% of customers walk into a convenience store for the first time and 50% spend ~£1 or more in each visit. Therefore, convenience stores want to host the chargers, as far as they drive new customers in their shops. Therefore, shared e-vehicle operators might be able to push the cost of the hardware onto the convenience store owners.

Also, the geographic density of convenience stores is much higher than that of motorcycle parking (where shareable e-bikes are typically returned to charge). Where a bike with a permanently installed battery requires physical space for both the charger and the whole bicycle to charge, a removable, shareable battery can charge while taking up much less space. Therefore, the charger can be placed inside existing shops.

Operators that do centralised battery swapping have large warehouses with racks upon racks of battery chargers. The solution presented here effectively 'breaks up' these chargers (e.g. into groups of 4), placed in an elegant box with cloud-connectivity, and spread across the city, comprising a network of distributed battery swap stations. A Pushpod may be placed in every square kilometer, for example. The convenience of having a charger placed in every square kilometre means that users are at most 550 m away from a recharge, and with the use of a mobile app, they can carry out the work of battery swapping operations teams for a fraction of the cost, as the user population and their geographic density is much higher than that of the operations teams.

An example of a battery sharing system 100 for micro mobility e-vehicles (e.g. e-scooters or e-bikes) is shown in FIG. 1. The system 100 includes a number of e-vehicles 110-1 to 110-N. The e-vehicles 110-1 . . . 110-N have a holster 111-1 . . . 111-N for receiving a battery and the system includes one or more batteries 112-1 . . . 112-N which belong to the system 100. The batteries 112-1 . . . 112-N are receivable by the holsters 111-1 . . . 111-N of the e-vehicle in order to provide power to the e-vehicle 110-1 . . . 110-N if authorized to do so via the cloud service. The batteries or vehicle (e.g. via elements of the holster) are communicatively coupled via the internet 150 to a cloud computing service 140. The cloud computing service 140 comprises one or more servers 141 running the backend software service for managing the battery sharing scheme across the elements of the system 100. As will be explained further, the cloud service 140 is able to track the usage of the batteries 112-1 . . . 112-N in the system and also to manage authentication (of users of the system) and authorization (e.g. for ejecting and using the batteries) operations via the cloud. In addition, the system includes one or more battery swap stations 120-1 . . . 120-N which are cloud connected devices able to communicate with the cloud computing service 140 via the internet 150. A battery swap station 120-1 . . . 120-N includes one or more slots each for receiving a battery 112-1 . . . 112-N from the system 100. In this embodiment, the battery swap stations 112-1 . . . 112-N have four slots 112-1 . . . 112-4. Once received in a slot the battery may be charged. As will be explained in more detail below batteries 112-1 . . . 112-N may be reserved at and ejected from the swap station using the cloud computing service 140 with which the swap stations 120-1 . . . 120-N are communicatively coupled.

Users of the system may communicate with the service using an application running on user equipment such as a smartphone 130. The application software allows the user to activate, reserve, and eject batteries from the various elements (e-vehicles, swap stations) in the system 100 by communicating with the cloud service 140.

As will be understood, there are several elements that enable the operation of the system 100. These are the battery swap station 120-1 . . . 120-N, the shareable battery(s) 112-1 . . . 112-N, the vehicle-side battery adaptor 111-1 . . . 111-N, the mobile app running on the user equipment 130 and the software that facilitates the operation (e.g. at the back end cloud server 140).

Battery Swap Station (Pushpod)

A Pushpod is a battery swap station 120-1 . . . 120-N. In an embodiment the Pushpod assembly comprises mainly an enclosure that houses 4 battery chargers 121-1 . . . 121-4, power electronics and a PCB. The battery chargers are preferably independent AC-DC charger modules. The PCB is a logic board implementing control and communication.

The Pushpod is designed with scalability in mind—it can be shipped through the post and requires no installation. It works off mains power and automatically connects to the cloud. When hosts (convenience store owners in this instance) receive it, they only need to unbox it and plug it to power.

In an embodiment, the POD communicates with a battery in the dock through an interface. For example, an RS-485 interface. Communication between the Pushpod and the battery is preferably encrypted. In an embodiment, communication allows for the following tasks:

Identification of the battery. The battery may communicate its unique serial number to the Pushpod, which allows tracking of that particular battery.

Authorization for charging (the authorization having been provided via the cloud service 140).

Requesting battery parameters on-the-fly (voltages, State of Charge, temperature, etc.) which may be used by the charger to optimize a charging operation.

In an embodiment, the Pushpod is connected to the server via the internet through a GSM module (for example, a 3G modem provided on the logic board). This enables the Pushpod to talk to the server 140, 141, for example, using USSD data and informs the server of the battery charge status. In an embodiment, battery ejection is controlled from the cloud service 140. Mechanically, the battery ejection is accomplished by means of PWM servo-motors in each dock 120-1 . . . 120-N. For example, one PWM servo-motor may move a latch freeing the battery and a second PWM servo-motor may eject the battery from the dock.

The 3G modem may be based on any known chipset, for example, the ublox SARA-U270 chipset. This provides 3.75 G UMTS/HSPA connectivity with a GSM/GPRS fall-back. The Pushpod may use Particle.IO for communicating with the cloud as an IoT (Internet of Things) device.

The 3G communication channel may be used, for example, to perform one or more of the following:
Authorise charge
Unlock (eject) the battery
Send/receive firmware version information and upgrades for the Pushpod and/or battery
Collect usage data relating to the Pushpod and battery e.g. new battery connected, battery disconnected, battery State of Health and cycles
Setting a battery to 'End of life'

In embodiments, the communications module may be any one of a GSM, 3G, 4G or 5G module/modem.

When the battery is docked in the Pushpod, battery performance may be analysed and ESR (effective or equivalent series resistance) and capacity data can be uploaded to the server.

In an embodiment, RGB LED rings are installed about each charging dock 121-1 . . . 121-4 which may provide status information regarding the battery in the dock.

In an embodiment, Pushpods 120-1 . . . 120-N are stackable, like Lego bricks. When demand for a specific Pushpod location is high, additional Pushpods 120-1 . . . 120-N may be dispatched to the store owner who can host, for example, up to 32 batteries. In an embodiment, the Pushpod PCB is equipped with a GPS module and informs the server of the Pushpod location. In an embodiment when two or more Pushpods 120-1 . . . 120-N are placed in the same store they automatically group in the backend system and self-identify as a single unit without intervention from the host.

The Battery

The battery 112-1 . . . 112-N is a shareable Li-ion battery that features a smart Battery Monitoring System and a smart battery locking system. In an embodiment, the battery assembly comprises of a plurality of Lithium-ion cells (industry standard, for example 20-30 cells would be appropriate), a PCB (BMS or Battery Monitoring System including a microprocessor) and supporting plastics/wiring.

The BMS serves as a logical and physical barrier to the battery pack such that unauthorised/non-recognisable devices can't consume power. When the battery pack connects to a shareable e-vehicle 110-1 . . . 110-N, the battery's logic unit communicates with the vehicle's logic unit through an encrypted protocol. In order for the vehicle to receive power from the battery, the vehicle needs to identify itself through an encrypted 'handshake'. If the vehicle is identified as approved for use, the BMS connects the battery cells to the vehicle's battery terminals and allows it to discharge the battery pack. This prevents unauthorised e-vehicles from using the battery.

The battery features a smart locking mechanism. Batteries need to remain locked on the shared e-vehicles in order to prevent theft (battery cells have re-salvageable value). In order to allow third parties to unlock the battery to facilitate a battery swap while keeping track of who removed the battery, the battery lock is electromechanically activated over the internet. Through the use of a mobile app, users can connect to the e-vehicle either through GSM (or 3G, 4G or 5G) or Bluetooth, for example. The app gives the authenticated user the option to release the battery for a battery swap. In an embodiment, the app, which is connected over the air to the vehicle, pings a signal to the vehicle to release the battery, which in turns pings a signal to the battery to unlock. The battery activates an electro-mechanical latch, which in turns frees the battery from its holster. In other embodiments, which will be described below, the vehicle (e.g. the battery adaptor/holster) is in communication with the cloud service 140. The cloud service authenticates the user and authorizes the release of the battery by send a message over the cloud to the vehicle (e.g. adaptor/holster). The vehicle adaptor having been authorized to release the battery activates the electro-mechanical latch and releases the battery to enable the swap.

The battery also acts as a data collection platform. Data including and based on battery performance, acceleration, temperature and others may be collected when the battery gets plugged in the Pushpod. In one embodiment, batteries implement an impedance tracking algorithm to calculate State of Charge (SoC) and keep track of the State of Health (SOH) of the battery. As a further way of retrieving the health of the battery, the number of charge/discharge cycles may be tracked (either in the BMS or at the server-side by linking charge/discharge cycles with a battery identification/serial number). The data is transmitted for analysis to the server via the internet connection. This data is used to monitor battery wear as well as preemptively detect battery failure using server-sided algorithms. Failure detection consist of a pattern recognition system which attempts to compare the analysis points before the failure of a battery to that of supposedly well behaving batteries. The data collection platform can be of interest to battery manufacturers who look to collect data on the performance of new cells.

One or more batteries 112-1 . . . 112-N in the system may include an LED bar for communicating different battery states to the user (Basic State of Charge, End of Life, among others). In an embodiment, a battery 112-1 . . . 112-N may be automatically balanced during charge and long idle periods using passive equalization. A battery 112-1 . . . 112-N may have means for communicating with the Pushpod 120-1 . . . 120-N or a vehicle side adaptor 111-1 . . . 111-N e.g. using RS-485. The battery 112-1 . . . 112-N may include an accelerometer which may be used to inform a user if they are inserting the battery in a wrong position or as an anti-shock system by sensing acceleration by gravity and thereby detecting that the battery has been dropped. Each battery 112-1 . . . 112-N may have a unique identifier such as a serial number. This is used to track information relating to the battery at both the cloud service 150 and the Pushpod/battery swap station 120-1 . . . 120-N.

The Vehicle Side Adaptor

In one embodiment, where the battery or other component of the e-vehicle 110-1 . . . 110-N is cloud-connected, the vehicle side adaptor (holster) 111-1 . . . 111-N may be extremely simple. In that embodiment, it may merely comprise a mechanical cage that supports the battery on the frame, a connector which connects the battery 112-1 . . . 112-N terminals to the vehicle terminals and a metal stamping that enables the battery latch to latch onto.

In another embodiment, the adaptor 111-1 . . . 111-N serves as a way to adapt third-party micro-mobility e-vehicles to embodiments of the invention. The adaptor may consist of a charger mounted on an existing cage/holster of an e-vehicle, and is configured to take energy from a battery 112-1 . . . 112-N that is participating in the system 100 and charge the e-vehicle's native battery. For example, this may be achieved via a DC-DC converter stepping the voltage at the battery 112-1 . . . 112-N terminals up or down to the correct voltage to charge or supply the native battery. Charging may take place not only when idle but also when the scooter is being ridden.

In an embodiment, the adaptor contains a communication module (e.g. GSM, 3G, 4G or 5G module/modem) thereby adapting the vehicle for communication with the internet 150 and the cloud service 140. In this embodiment, the adaptor 111-1 . . . 111-N may receive authorization from the cloud to discharge the battery and/or to unlock (eject) the battery from the holster of the adaptor 111-1 . . . 111-N. The adaptor 111-1 . . . 111-N may be in communication with the battery 112-1 . . . 112-N through a wired connection e.g. RS-485 (as with the Pushpod/Battery swap station). The communication between the battery and the adaptor 111-1 . . . 111-N may be encrypted and be used for one or more of the following:

Identification of the battery 112-1 . . . 112-N

Discharge activation. The battery only works in the e-vehicle if it is first authorized by the adaptor 111-1 . . . 111-N. The authorization comes from the cloud service 140 via the internet 150.

In other embodiments, the vehicle itself 110-1 . . . 110-N may have the communication module (e.g. integral to the vehicle). Accordingly, communication in such embodiments may be between the vehicle communication module and the cloud service 140 via the internet 150. The vehicle communication module (IoT module) would then be adapted to communicate with a cage/adaptor 111-1 . . . 111-N and the cage/adaptor 111-1 . . . 111-N act in response to those commands e.g. an authorized request to discharge the battery and/or to unlock (eject) the battery from the holster of the adaptor 111-1 . . . 111-N. The communication between the vehicle communication module and the adaptor may be via a wired connection e.g. RS-485.

The battery ejection may be performed, for example, by a mechanical system consisting of one or more servos and a spring which moves a latch and frees the battery such that the spring ejects it.

The internet communication may be via a 3G (alternatively GSM, 4G or 5G) modem module based on the SARA-U270 chipset and may use Particle.IO to connect to the cloud service 150. The cloud communication serves to provide at least one of the following:

Authorization of discharge

Unlocking (eject) the battery

Updating the adaptor firmware if necessary

In another embodiment, the cloud connecting functionality is provided integrally with the e-vehicle 110-1 . . . 110-N and no adaption to provide energy from a system battery 112-1 . . . 112-N to a native battery is therefore necessary. The cloud functionality is, however, as above and provides for authorizing a battery to discharge, unlocking a battery and updating firmware of any electronic hardware on the vehicle.

The Mobile Application

A mobile application (app) facilitates the battery swap operation, as well as standard, secondary functions such as accounts, payments, vehicle interaction. Users may use the mobile app as an identification (authentication) mechanism to release batteries. In other words, the application is a client application which is acting on behalf of an authenticated user. The mobile app shows users the charge status and location of batteries in space. Unlocking batteries from the e-vehicle 111-1 . . . 111-N or Pushpod 120-1 . . . 120-N is facilitated through the app in order to keep track of who is responsible for the battery at any point. Authentication of a user is process that enables the cloud service 140 to verify the user's identity e.g. which provides a user id as an artifact of the authentication. Authorisation is a process of verifying that a specific action in the system is permitted by a user (e.g. an authentication user).

Authorisation may be performed by the system 100, e.g. between the user equipment 130 and the cloud service 140, using a token-based system such as Json Web tokens. This further allows clients including web applications that can run on a browser as well as mobile applications that run on mobile devices 130 to use the system 100 securely and setup a set of rules that deal with the unsecure nature of the above.

The main way that authentication and authorization processes take place for this group of clients is by using Json Web Tokens (JWT). JWT is an open standard (RFC 7519) and provide a secure and performant way to sign a set of data and verify later that the data are the original signed ones.

When combined with other techniques as secure communication channels and by making them short-lived by having them expire at a predefined time make them ideal way to authenticate and authorize users.

The way JWTs are used to authenticate users is described by the following:

Each user is provided with a set of credentials via email (email, password).

The password needs to be reset the first time the user request to use the client app.

By using their credentials, the app users submit a form which sends the credentials encrypted via an HTTP header to the platform.

The platform validates that the credentials are correct.

The platform responds with an access token (JWT) that can be used for the next requests.

The access token is signed using HS256 algorithm.

The JWT signature secret is stored in the platform.

The access token includes information regarding the user unique identifier and the user scope.

The token is accompanied by a refresh token (JWT).

The access token is set to expire after 60 minutes by default.

The refresh token can be used by the client application to seamlessly request a fresh access token without requesting the user credentials again.

When JWTs are the way to authenticate users, they are also used to carry a user scope in order to verify that the user actions requested are allowed to be performed by the specific user. In other words, they also provide authorization e.g. verifying the actions of an authenticated user. The user scope is a set of space separated strings described in the scope property of each JWT's payload.

API keys may be used for authentication at the backend, the integration steps of using the backend API by an operator include the generation of a token to be used programmatically on each request. This token is associated upon creation with the specific operator and is regarded value until revocation.

A user id (usually a UUID) from which all the important information for the user can be found (e.g. the operator the user is linked to).

The backend API is using an API key against which the users are authenticated. The authentication artifacts are the information after the API key is resolved from the database. They are the operator's unique identifier and it scope (the actions allowed to be executed by this user/tenant of the system) which is the set of permissions matched against the operation requested.

The Back-End

The backend receives and captures all events that happen in the system 100. In case of the battery 112-1 . . . 112-N, this includes at least one of (un)docking the battery in a cage 111-1 . . . 111-N or Pushpod 120-1 . . . 120-N, state of charge updates, state of health updates, extreme behaviour events, etc. By storing these events we can easily trace back ownership, system health, faults, user events and much more at any point in time.

The backend may capture this data using an event sourcing data model. This way the data can in later stages be re-interpreted and organized in any desired structure for the purpose of big data analysis, as no data is lost in this model.

One desirable requirement for the platform 150 is to be able to track the entity responsible for a battery at all times. The tracking takes place in a battery transactions table in a separate battery history service in the platform. Each time an ownership critical action is successfully completed an entry is added in the table that contains all the information for the transaction. Separate ledgers are created for each of the above user pools and the transactions are marked as IN or OUT. This logic allows the platform to programmatically access all the transactions that have taken place throughout the user operation time and resolve the current state of each battery.

The battery events ledger 1413 can be defined as a battery grouping mechanism that enables the above requirement. It is a common way to keep track of money transactions in banking systems and by applying this logic for hardware ownership changing can create a robust mechanism that is based on immutable entries with all the benefits it can provide. Thus, a verified transaction never changes and the only way to transfer the ownership of a battery is to add a fresh entry describing the new state.

Each transaction entry includes a reference to the user that was involved in it. This is the way to keep track of the battery to user association and never lose this information because of the immutable state of the above entries. The user information is resolved out of the authentication artifacts described in the authorization and authentication document.

When a battery transaction is verified by the IOT entry point to the system the associations are resolved by checking the transaction requests already created in the system by a user action. This means that a battery ejection event coming from a device is associated with any ejection request previously tracked in the system in the swap model and with the user logged there.

Figure 2:
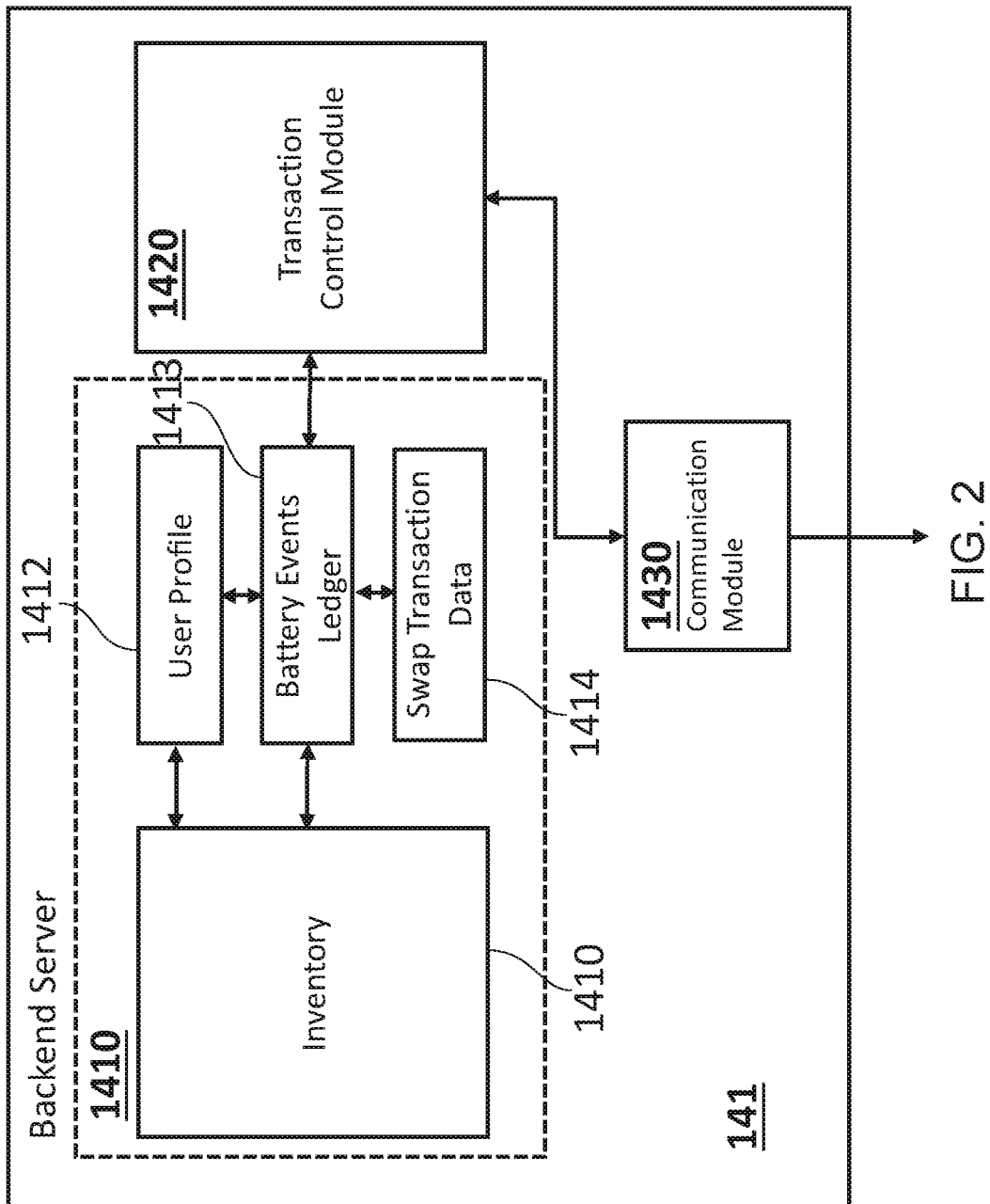
FIG. 2 is a block diagram of a server in an embodiment.

FIG. 2 shows a block diagram showing elements of a back-end server 141 of the cloud service 140 according to an embodiment. The arrangement of modules shown provides for a battery tracking scheme according to an events-based system that allows the batteries 112-1 . . . 112-N participating in the system 100 to be efficiently tracked. The backend server includes a system database 1410, a transaction control module, and a communications module 1430. The database 1410 includes a number of interrelated modules that store data relating to elements of the system 100. These include an inventory database 1411 that includes data regarding the fleet of vehicles 110-1 . . . 110-N and batteries 112-1 . . . 112-N in the system 100. There is a user profile module 1412 that includes records for users registered with the service 140 (e.g. name, email, password). A battery events ledger 1413 is the core records module which records all transactions relating to batteries 112-1 . . . 112-N that take place in the system 100. The swap transaction data module 1414 contains the specific data identifying particular transactions and their characteristics and this data is linked to entries in the ledger 1413. Also, linked to the ledger are records from the inventory so such that ledger entries and their transactions can be identified with specific elements (Pushpods 120-1 . . . 120-N and e-vehicle adaptors/cages 111-1 . . . 111-N) and tenants (registered users that have possession of a battery in the system). The user profile data records 1412 are linked to both the battery events ledger 1413 and the inventory 1411 as a user can be a tenant and also associated with a particular event recorded in the ledger 1413.

A transaction control module 1420 is coupled to the database 1410 and in particular the ledger 1413. The control module 1420 is configured to provide data that instructs the ledger to be updated in accordance with control logic that responds to signals indicating events or requests received via the communications interface 1430. The transaction control module is coupled to the communications interface 1430 which receives event data, requests and allows requests (e.g. to eject a battery) to be sent from/to entities in the system 100.

Figure 3:
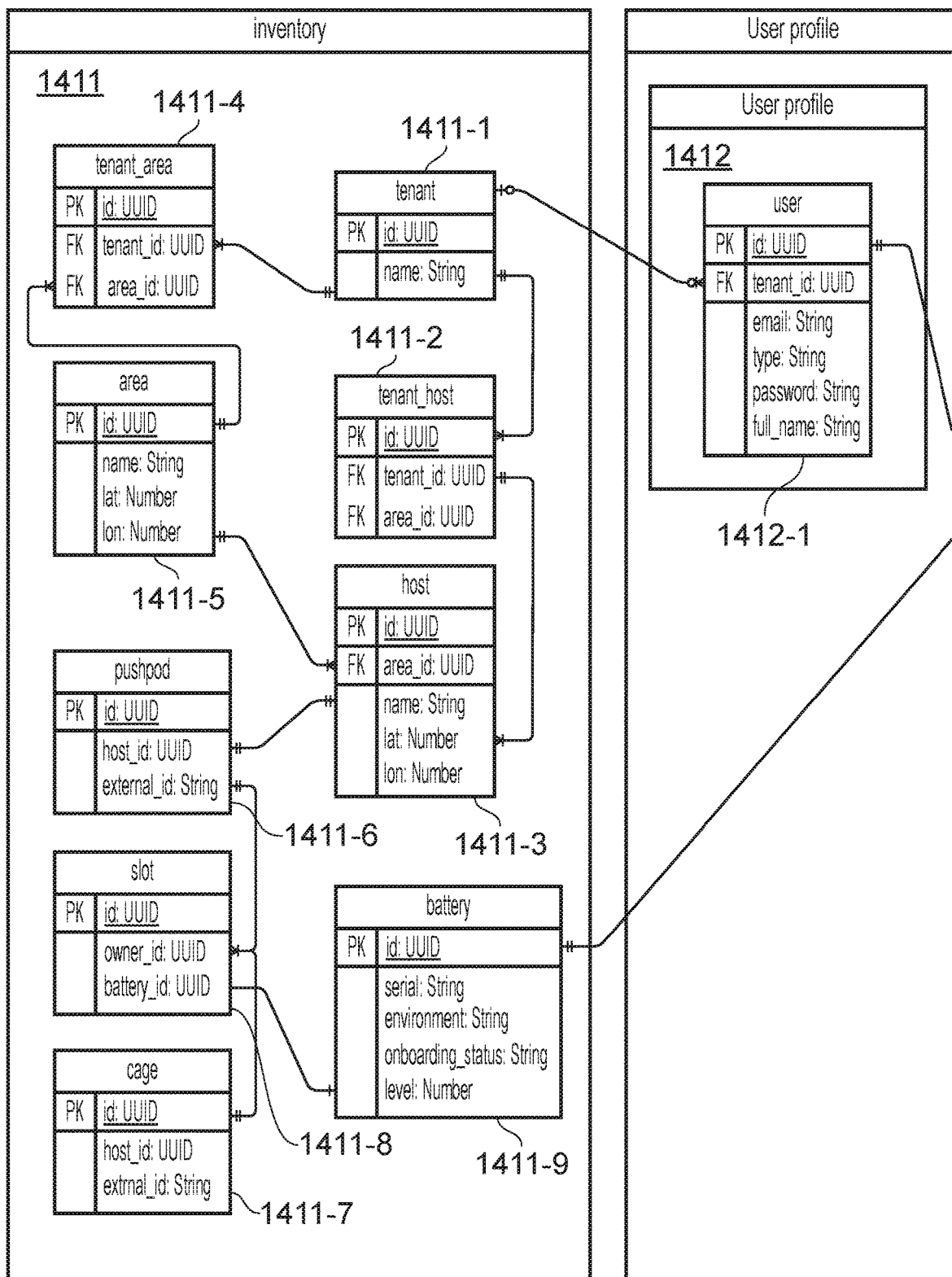
FIG. 3 is a block diagram showing a scheme for battery tracking in a relational database according to an embodiment.
Figure 3:
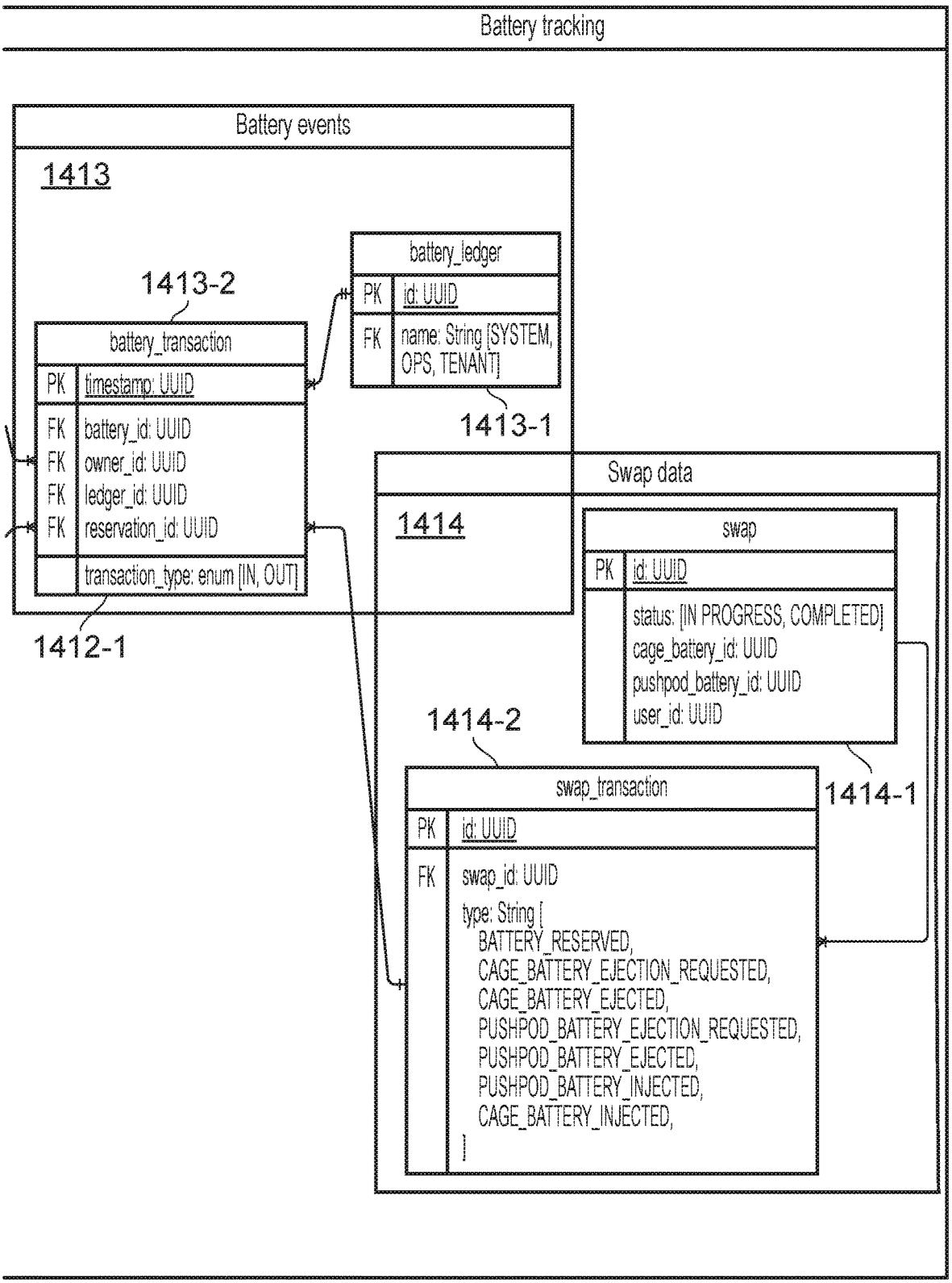

FIG. 3 shows the inventory 1411, user profile 1412, battery events ledger 1413, and swap transaction data 1414 modules of the backend server 141 in more detail. In particular, these data elements are shown as a set of related data records using conventional 'crow's feet' or 'Martin' notation where records are addressed using primary keys ('PK') and foreign keys ('FK') in the conventional manner for relational databases.

The core of the battery tracking scheme is the battery events ledger 1413 which includes a battery ledger 1413-1 and a battery transaction table 1413-2. The battery ledger 1413-1 includes an entry for each transaction that takes place in the system 100. The battery ledger 1413-1 has an id that is a Universally Unique identifier (UUID), although it will be appreciated other identifier schemes may be used. Multiple battery ledgers may exist each related to different battery sets. Accordingly, a data field for the battery ledge 1413 is a string indicating the nature of the battery ledger 1413-1 referred to by the id. For example, the string indicates if the batteries associated with the ledger are batteries that are active and available in the system ('SYSTEM'), not available to tenants in the system 100 but is being used by an operations team ('OPS') or currently out and associated with a user registered with the system ('TENANT'). Battery transaction records 1413-2 are associated to a ledger 1413-1. Each battery transaction record includes an id that is a timestamp UUID ('timestamp:UUID') indicating the time at which the transaction referred to by the record took place. There are fields for:

a battery identifier 'battery_id' (an internal UUID identifier for each battery in the system)

a UUID identifying the user that is the owner (i.e. a tenant user) of the battery referred to ('owner_id')

the UUID identifying the battery ledger 1413-1 to which the transaction 1413-2 belongs ('ledger_id')

a UUID acting as an identifier of a reservation/transaction ('reservation_id') associated with the battery transaction record 1413-2.

The details of each swap transaction (e.g. injections/ejections and reservation of a battery) are stored in the swap transaction data module 1414. Each swap operation (that includes all the steps in swapping out a battery 112-1 in the system 100 for a fresh battery 112-2 from a Pushpod 120-1 . . . 120-N) has an associated swap record 1414-1. Each swap record 1414-1 has a one-to-many relationship with the swap transaction records 1414-2. The swap transaction records 1414-2 include details of each transaction that takes place in the sequence in swapping the battery. The swap record 1414-1 has a UUID identifier as its primary key and has the following data fields:

a status field ('status') which indicates the state of progress of the swap, i.e. whether the swap is in progress ('IN_PROGRESS') or complete ('COMPLETED')

a cage battery id field with the UUID of the battery at the cage (adaptor/e-vehicle) involved in the swap a Pushpod (swap station) battery id ('pushpod_battery_id') filed with the UUID of the battery at the Pushpod that is involved in the swap a user ID ('user id') which identifies the user registered within the system doing the swap.

Each swap transaction record 1414-2 is linked to a swap record 1414-1 by a 'swap_id' UUID, which is a field in the swap transaction record 1414-2. Each swap transaction record 1414-2 also has its own UUID id which links the transaction to a battery transaction record 1413-2 of the battery ledger 1413-1.

As mentioned, the cloud service 140 uses an event driven system. Each swap transaction record 1414-2 includes a string field that indicates which event in the swap process it refers to. In this way every event in the swapping process is recorded in the battery transaction table 1413-2 and a full immutable ledger record of all battery events is stored. These events include "BATTERY_RESERVED", i.e. reservation of a battery at a Pushpod "CAGE_BATTERY_EJECTION_REQUESTED", i.e. ejection of a battery at the cage (adaptor/e-vehicle) has been requested "CAGE_BATTERY_EJECTED" i.e. the battery at the cage (holster/adaptor/e-vehicle) has been released at the e-vehicle by the cage (holster/adaptor/e-vehicle), "CAGE_BATTERY_INJECTED", i.e. the battery released from the cage has been inserted at the Pushpod (swap station), "PUSHPOD_BATTERY_EJECTION_REQUESTED" i.e. ejection of the reserved battery at the Pushpod (swap station) has been requested, "PUSHPOD_BATTERY_EJECTED", i.e. the reserved battery at the Pushpod (swap station) has been ejected by the Pushpod, "PUSHPOD_BATTERY_INJECTED", i.e. the battery originally at the Pushpod has been inserted at the e-vehicle (e.g. in its holster/cage/adaptor)

As will be subsequently explained these events track the batteries during a swap process. Further, the battery transaction records 1413-2 are linked with the user records 1412-1 of the user profile via the 'owner_id' foreign key which indexes the primary id key of the user records 1412-1. The user record 1412-1 includes fields that include:

a string that is the user's email address ('email')

a string that denotes the type of user ('type') i.e. categories of users that can reserve a battery and swap it. For example, a customer or a member of a support team. An existing customer can be referred to as a User of type 'TENANT_CUSTOMER', A member of a support team that is assigned to move around the city and complete battery swaps is mapped as a User of type 'TENANT_OPS'. Other user types may be possible to further categorize users of the system.

a string that is the user's password ('password') e.g. for accessing the cloud service 140 through an app on user equipment 130 a string that is the user's name ('full name')

In addition, there is a foreign key that is an identifier linking the user to the inventory with a tenant of the system (i.e. a user that is using/associated with a battery that belongs to the inventory 1410 of the system). The inventory 1410 includes a variety of linked records that record all the elements included in the system and information relating to where that are hosted/located. The inventory 1410 may be thought of as a virtual store of each part belonging to the system. A tenant record 1411-1 has a tenant identifier UUID and name field that is the name of the tenant user. A tenant is a service provider that is using the current system. Each tenant may be linked with one or more host devices via a tenant host record 1411-2 that links to a host device record 1411-3. A host is store that hosts a Pushpod belonging to the system. The tenant host record 1411-2 has foreign key fields that are the tenant identifier ('tenant_id') and area ('area_id'). This linkage allows for a tenant to be associated with multiple hostdevices e.g. stores or other venues hosting a Pushpod.

The host record 1411-3 has an identifier to uniquely identify each host and a foreign key field denoting an area in which the host is located. In addition, each host has specific latitude and longitude information stored in the 'lat' and 'lon' number fields giving its more specific location. For example, these might indicate the location of a convenience store or other premises in which a Pushpod is located.

Each tenant 1411-1 is also linked with an area record 1411-5 via a tenant area record 1411-4. The tenant host record 1411-2 has a UUID has its primary key and a tenant id and area id as foreign keys. Similarly, the tenant area record 1411-4 includes a UUID identifier as a primary key and a tenant id and an area id as foreign keys.

An area record 1411-5 denotes a particular region or area such as a city or neighbourhood. The area record 1411-5 has fields denoting i) the name of the Area ('name') and the latitude and longitude coordinates of the area ('lat' and 'lon'). In this way a tenant user of the system may be associated with multiple areas via the tenant area record 1411-4 linkage. For example, a first service provider might be using the system in London, Paris and Madrid and a second service provider be using only London and Paris. Hosts 1411-3 and tenants 1411-1 may be associated with particular areas.

The host device 1411-3 may be a Pushpod 1411-6 or cage (adaptor/holster/e-vehicle) 1411-7 that belongs to the system. Each Pushpod 1411-6 or cage 1411-7 having one or more slots is linked to respective slot records 1411-8. In the case of the Pushpod, at least in this embodiment, the Pushpod will be linked with four slot records 1411-8 each with a unique ID and a cage/adaptor would be linked with one corresponding slot record 1411-8 with a unique ID. In this way a battery 1411-9 can be associated with a particular slot of a device (cage or Pushpod) in the system. Both the Pushpod 1411-6 and cage 1411-7 records have a unique identifier as the primary key and are linked to a host record 1411-3 via a host id field ('host_id'). Both also include a field denoting an identifier ('external_id') that allows the device to be addressed externally e.g. through the internet or other network gateway.

Each slot record 1411-8 includes a device id ('owner_id') which is a Pushpod id or cage id that links the slot with a respective Pushpod 1411-6 or cage 1411-7 device record. Further, it includes a battery identifier field ('battery_id') which is able to link a battery of the system to the slot via a battery record 1411-9.

A battery record 1411-9 includes a unique UUID identifier for the battery and data fields for: a serial number ('serial') of the battery (i.e. this could be the manufacturer serial number of the actual battery rather than the internally used battery UUID), a string denoting the environment of the battery (e.g. test, production, in/out of the system), a string ('onboarding_status') denoting whether the process by which the battery has been placed onboard the e-vehicle, and the level of charge of the battery ('lever'). Regarding the 'onboarding status', a battery can be inserted (i.e. recorded) manually in the system (e.g. via an admin portal of an administrator device) or be detected automatically when inserted in a device (Pushpod or Cage). Automatic detection verifies that the battery is on board as an event from the fleet has been received with the insertion. The 'onboarding status' denotes which process has taken place with regards to the battery e.g. manual or automatic detection.

As well as being potentially linked with a slot 1411-8, each battery record may be linked to one or more battery transactions 1413-2 of the batter ledger 1413-1 via the battery identifier ('battery_id'). Accordingly, the location and ownership of a battery is recorded in the inventory 1411 and transactions involved in swapping a battery are recorded in the battery events ledge 1413.

Battery Swapping

An example, in which a user swaps out a battery from an e-vehicle cage with a replacement battery from a Pushpod (swap station) will now be described with reference to FIG. 4.

We consider the situation where a user is using an e-vehicle with a cage/adaptor 111-1 holding a battery 112-1 that belongs to the system 100 and wishes to swap the battery 112-1 for a freshly charged battery 112-2 at a Pushpod 120-1. The user would open a dedicated application on their smart phone (or another user equipment). At step 401 the user makes a request via the application to reserve a battery at a Pushpod 120-1. The user having opened the application will have been authenticated using, for example, the Json web token protocol, so the user making the request via such a token will be permitted (e.g. have authorization) to perform actions including reserving the battery and ejecting the battery from the cage/holster of the e-vehicle 111-1. For example, the user may be presented by the application with a map view on which are overlaid the locations of Pushpods which are either near the user or on a route which the application has determined that the user may be taking. The user can then select which Pushpod they wish to use to perform the battery swap and that request is sent to the cloud service 140 managing the system. At step 402, a swap record 1414-1 is created at the backend server and a "BATTERY_RESERVED" transaction record 1414-2 created and stored at the battery events ledger 1413. The relevant battery transaction 1413-2 will link to the battery being reserved in the inventory 1411 that is in turn associated with a slot record 1411-8 of a Pushpod record 1411-6 in the inventory 1411, for example.

At step 404 the server sends confirmation to the application over the cloud and the application moves to the next screen in the reservation process. The screen on the app displays information telling the user to move towards the location of the Pushpod i.e. the host of the reserved battery. This could be done with a simple message or via directions given from mapping application software using location data of the smart phone on which the application is running.

Having received the instruction via the screen, the user then moves their e-vehicle, including cage 111-1, to the location of the Pushpod 120-1 (step 404). Location data of the cage 111-1 is sent to the backend server at step 405 with a view to monitoring the location of the e-vehicle cage 111-1 with respect to the Pushpod 120-1 at which the battery reservation has been made. Alternatively, the location of the smartphone 130 could be used as indicative of the location of the cage 111-1 of the e-vehicle. When the user has approached the location in which the Pushpod 120-1 with the reserved battery 112-2 resides, at step 406 the user may request ejection of the battery 112-1 from the e-vehicle cage 111-1 via the app. Alternatively, the request may be made automatically by the app upon the location data indicating that the cage 111-1 is close to the Pushpod 120-1 location.

Having received the request from the application 130, the cloud service 140 confirms at step 407 that the cage location is sufficiently close to the Pushpod location to permit release of the battery 112-1 from the e-vehicle. This also includes the service 140 updating the battery events ledger to include a swap transaction entry 1414-2 associated with the current swap 1414-1 indicating that "CAGE_BATTERY_EJECTION REQUESTED". If the user is authorized/permitted to do so (e.g. by the Json Web Token), at step 408, the cloud service communicates with the cage of the e-vehicle (e.g. wirelessly through the internet) with a request (authorization data) to release the battery. At step 409, the cage having received the authorization, releases/unlocks the battery by activating the relevant servo motors to release the locking mechanism for the battery. A confirmation signal is then sent from the cage 111-1 to the cloud service 140, at step 410, confirming that the battery 112-1 has been released from the cage 111-1. The cloud service 140 then updates the battery events ledger 1413 accordingly at step 411. For example, by adding a swap transaction record 1414-2 of type "CAGE_BATTERY EJECTED". The cloud service 140 then sends an instruction or notification to the application 130 that pushes the application to the next screen (step 412).

The next screen will be a notification to the user to go to the Pushpod 120-1 and scan a QR code at the front of the Pushpod 120-1. At step 413, the user approaches the Pushpod 120-1 at which the battery 112-2 has been reserved scans the QR code on the Pushpod enclosure. The retrieved QR code is then sent, at step 414, to the cloud service 140. The QR code data is compared with a look-up table that one of the servers 141 of the cloud service to confirm that the user is located at the correct Pushpod at which the battery 112-2 has been reserved. The cloud service then communicates via the internet with the cloud connected Pushpod 120-1 to instruct it to eject the battery 112-2. When this is done, the cloud service updates the battery events ledger 1413 to add a transaction 1414-2 associated with the swap 1414-1 that is of type "PUSH_POD_BATTERY_EJECTION REQUESTED".

The Pushpod 120-1 having received the instruction from the cloud server 140, then at step 417, activates the servo motors at the slot 121-1 corresponding to the reserved battery and unlocks and ejects the battery 112-2. A confirmation signal is sent from the Pushpod 120-1 to the cloud service 140, at step 418 confirming that the battery 112-2 has been ejected and is out of the Pushpod 120-1. The cloud service 140 then, at step 419, updates the battery events ledger 1413 with a swap transaction entry of type "PUSHPOD_BATTERY_EJECTED". The cloud service 140 then sends an instruction to the application 130 to push it to the next screen.

The next screen on the application 130 will show an instruction to tell the user to insert the battery 112-1 ejected from the cage 111-1 of the e-vehicle into the now vacant slot 121-1 of the Pushpod 120-1. The user then inserts the cage battery 112-1 into the vacant slot 121-1 (step 421) and the Pushpod 120-1 sends a confirmation signal to the backend server 140, including an identifier of the received battery 112-1 (step 422). The cloud service 140 then updates the battery events ledger to include a swap transaction of type "CAGE_BATTERY INJECTED".

The user then inserts the battery 112-2 retrieved from the Pushpod 120-1 into the cage 111-1 of the e-Vehicle (step 421). This causes the cage 111-1 to signal to the cloud service that the battery 112-2 has been inserted. The cloud service 140, at step 423, updates the battery events ledger 1413 to reflect this by adding a swap transaction event of type "PUSHPOD_BATTERY_INJECTED". Having updated the ledger 1413, and confirming that the expected battery is in the cage, the cloud service 140 then sends a request, at step 427, to the cage 111-1 for it to discharge (i.e. use) the battery to provide energy to the e-vehicle. In a final step 428, the cloud service sends a confirmation to the application 130 that the swap is successful and the batter at the cage 111-1 is ready to use. The application 130 then moves to a completion screen telling the user that the swap is complete.

Figure 4:
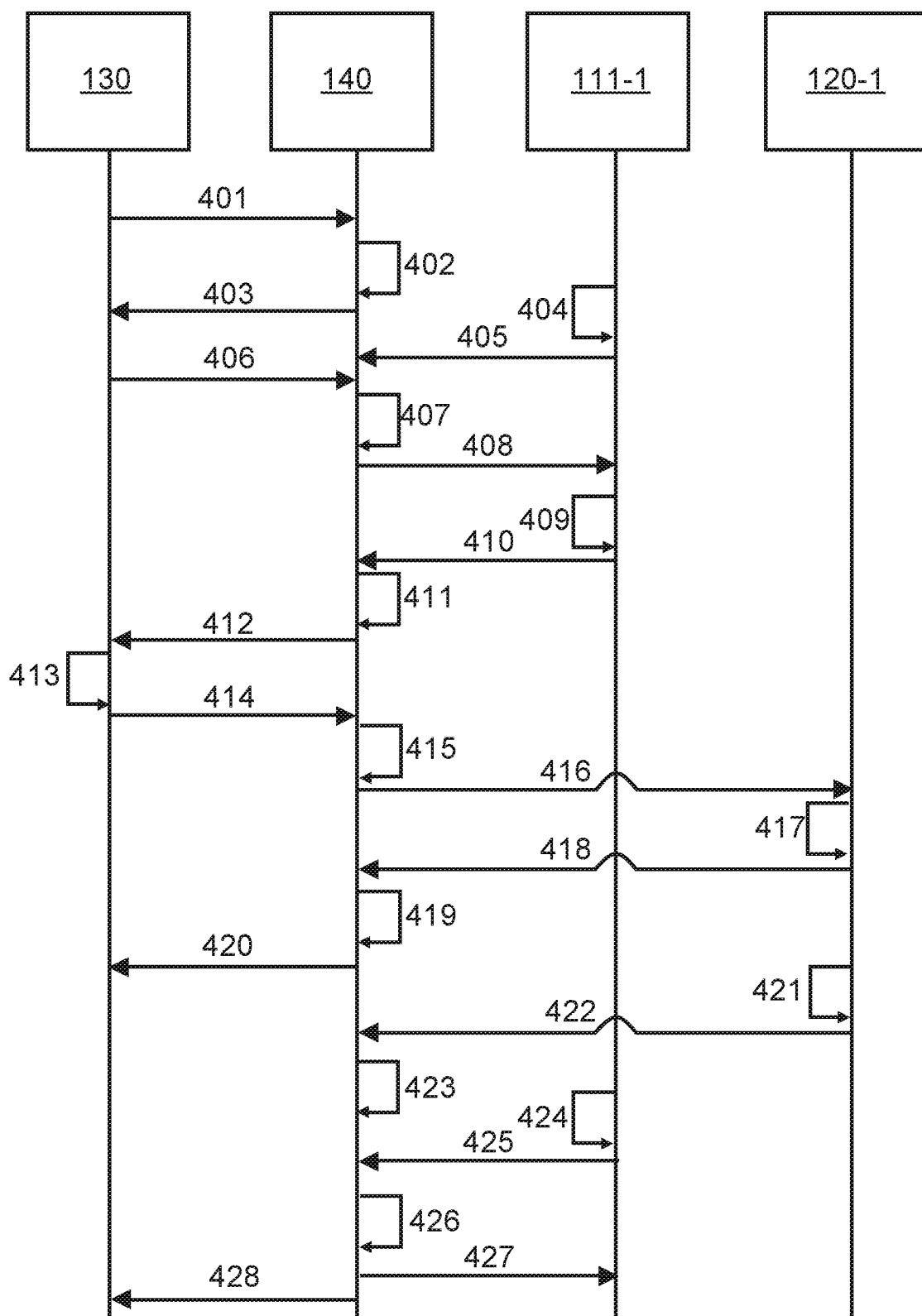
FIG. 4 is a schematic representation of a communications flow between elements in a system according to an embodiment.

In the embodiments of FIGS. 3 and 4, reference is made to the battery being released from a cage/adaptor of a micro-mobility e-vehicle and the cage being instructed to release the battery. However, it will be understood that the entity at the e-vehicle that releases the battery may be a holster at the e-vehicle without the capability to charge a native battery but rather to directly power the vehicle itself. Also, the means to unlock the battery may be integral to the e-vehicle. Further, the unlocking of the battery at the vehicle may be performed by means on the battery itself rather than the adaptor.

As will be appreciated other schemes may be possible for performing the battery swap between the components of the system that enable the release/unlocking of the battery from the holster/cage/adaptor/e-vehicle via the cloud using an application.

Pushpod Charging Routines/Surge Pricing/Demand Matching

Figure 5:
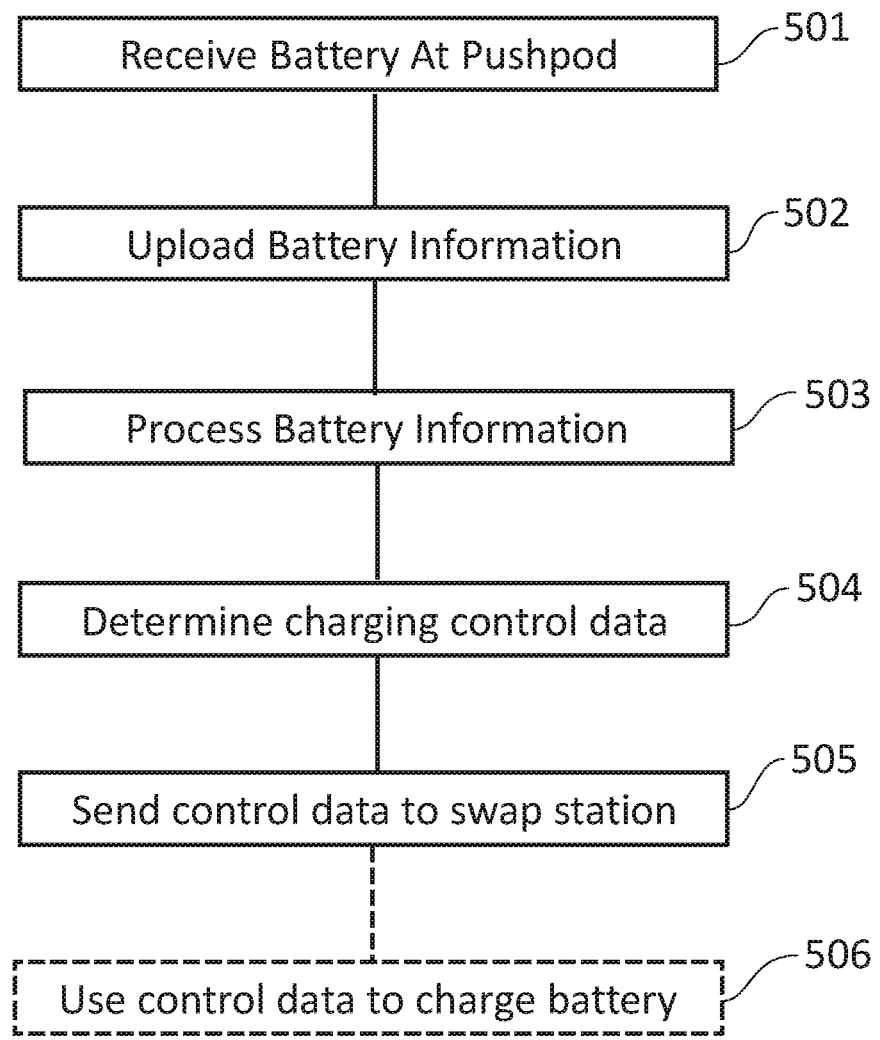
FIG. 5 is a flow chart showing a method of controlling battery charging according to an embodiment.

FIG. 5 shows an embodiment for determining control data for charging batteries at a Pushpod (swap-station). In a first step 501, a battery is received at the Pushpod (swap station). In other words, a battery is injected in one of the slots 121-1 . . . 121-4 of a Pushpod 120-1. Having received the battery, battery information (battery data) is uploaded to a server 141 of the cloud service 140 at step 502. The upload of battery information may be directly in response to the injection of the battery at the Pushpod or it may be at a predetermined time or time interval.

The battery information may be information concerning the status of an individual battery. For example, it might be battery health information uploaded from the battery's battery monitoring system. Alternatively, battery information might also be usage information associated with usage of batteries at the charging slots 121-1 . . . 121-4 of a Pushpod 120-1. For example, how often batteries have been charged or swapped at the Pushpod 120-1. In other words, the battery information may be an aggregation of battery data from batteries inserted into the Pushpod.

In step 503, the battery information that has been uploaded is processed at the cloud service 140. Processing may include aggregating the battery information at a server 141 of the cloud service 140 e.g. to record a total number of system events relating to the battery that have happened at Pushpod. For example, each time a battery is charged or swapped out, this event may be recorded at the server 141 in the battery transaction ledger 1413. Accordingly, the battery information of multiple Pushpods in similar locations may be combined and used. For example, the total number of swaps/charges in a particular area at a particular time or time period (morning, evening, night) may be determined by aggregating or collating the data from the Pushpods known to be in that particular area. Processing the battery information may also include determining the health of a particular battery 112-1 . . . 112-N in the system.

The processed battery information may then be used to determine control data (step 504) that may be used to control charging at one or more chargers at a Pushpod (swap station) 120-1 . . . 120-N. For example, the control data may be a rate of charge determined based on the health of the battery determined by processing the battery information. In that case, the charging control data may be specific to control the charging of the particular battery for which battery information has just been uploaded. Alternatively, the charging control data may be for the Pushpod generally and for any battery used at its chargers. This might be the case where the processing is of usage data relating to that Pushpod or collated usage data of Pushpods in a particular area. This can be used to make an estimate of demand at a Pushpod or area which can be used to set the charging parameters based on the demand (e.g. a rate of charge).

The control data that has been determined is then sent in step 505 to a Pushpod 120-1 ... 120-N to control charging at one or more of its slots. Having received the control data, at step 506, the Pushpod uses the control data to control charging of one or more batteries injected for charging in its slots 121-1 ... 121-4.

Using the method of FIG. 5, for example, a Pushpod has the ability to control the time and rate of charge of batteries i.e. flexible charging, in other words according to what we call here 'battery recharge demand' (BRD) The battery recharge demand sets the charging speeds of the Pushpods from slow to quick, according to how quickly batteries are needed. This is important because electricity cost varies during the day, and rate of charge of the batteries determines the lifespan of the battery (high current charging makes batteries wear quicker). By aggregating usage information at the Pushpods, it is possible to predict energy demand for a specific Pushpod (based on the historical usage data) and hence increase or decrease the rate of charge of the batteries to make sure demand is matched. For example, when demand is expected to be low, batteries get charged slower in order to maximise the health of the batteries. Conversely, when demand is expected to be high the batteries may be charged faster despite any detriment to the lifespan. This gives flexibility on serving spikes of demand for energy.

Flexible charging enables operators to respond to energy/swap demand peaks by accelerating battery charge times and also maximise battery lifetime by charging slowly/optimally during downtime. In one example, the Pushpod may be preprogrammed with charge control data based on previously aggregated usage data to respond to expected demand. Battery recharge demand (BRD) optimises for availability of batteries and takes into account the cost of electricity and battery depreciation. When demand in a certain location is really high (or predicted to be really high in a certain timespan in the future), Pushpods can 'supercharge' batteries in order to service this demand.

As mentioned above, in some embodiments the battery health or condition may be taken into account when determining the charging control data from battery information at step 504. In other words, the recharge ability of each battery determines the 'envelope' of currents (or recharge demands) that the battery can support, and therefore limits the battery such that the cells aren't damaged. i.e. an old battery in a super high recharge demand area is limited to moderate charging rates, because it's old, even though the demand is high.

Li-ion batteries for micro-mobility e-vehicles are typically charged at a fixed rate of current, irrespective of their age, temperature and general health. When a battery is new, charging it at from 0% to 100% at 5A doesn't impact the health. However, as the battery ages, the deep charge/discharge cycles and the current start to harm the battery. The older the battery, the more the damage. This means that if an ageing battery is charged under the same circumstances, the rate of degradation increases exponentially as the battery goes through more charge/discharge cycles. The 'age' of the battery is determined by its ability to store power, also known at State of Health.

One measure of a battery is its state of health (SoH). The units of SoH are percentage points (100%=the battery's conditions match the battery's specifications). As the battery degrades, it can hold less power than before. However, battery degradation (SoH) and age (cycles) aren't directly related. A battery that is handled carefully during charging can go through many cycles and still deliver close to the original capacity (95%+SoH).

By uploading battery information, it is possible to monitor the condition of each specific battery during each use/discharge. When the battery is inserted in the Pushpod, the data that were locally collected (on the battery's microprocessor/BMS) are fed (uploaded) to the cloud service 140. The cloud service 140 may keep a record of every charge and discharge datapoint of the battery, thus giving the ability to construct a historical performance log. When the battery is in the Pushpod 120-1 waiting to be charged, software on the cloud service 140 determines an optimal charging profile and conditions for the specific battery, taking into account its historical performance data. The charging profile is then fed/downloaded to the Pushpod and a custom charging routine is executed for that (and potentially every) battery.

As the history of each battery ID (as per the inventory 1411 and battery transaction ledger 1412) is known, before it is charged, the optimal charging parameters (i.e. current, temperature envelope) may be determined. In this way it is possible to maximise the lifetime of the batteries and maintain a high SoH and service lifetime.

Even more specifically, having a complete charging/discharging history for each battery can be used to optimise future charging/discharging management, on an individual basis. Batteries 112-1 ... 112-N may store data locally. That data is accessed via the cloud service 140 when the battery is docked on a Pushpod or e-scooter (e.g. via an adaptor), both of which have internet connectivity.

The following values (time series, logged continuously) may be uploaded as battery information (step 502)

Charging/discharging current

Battery core temperature

Voltage of the battery terminals and individual cells

Acceleration profile of the battery

The above data may then be processed (e.g. at step 503) to determine the depth of charge/discharge of each cycle and the environment in which it took place (e.g. battery charging when hot can harm the cells etc.). From there, a charging profile for each battery can be determined that takes into account it's age, SoH, and any special events that might have taken place.

For example:

older batteries should be charged/discharged with relatively less current and have their charge voltage termination reduced, depth of discharge increased etc. Older batteries should generally be 'stressed less' in order to not deteriorate further;

A battery that has a history of being charged to high voltages and discharged to low voltages, should overtime be stressed less in order to maintain optimum performance (reduced charging/discharging currents, reduced charging voltage termination, increased depth of discharge);

A battery that has been continuously charged when hot should be less stressed, as the cell chemistry is affected.

In another embodiment, a combination of the battery health and condition information together with information relating to demand may be used. For example, when demand is high but the battery condition is low to the point where it would normally be charged at lower rate to not stress the cell chemistry, the battery may be charged at a slightly higher rate. This may ultimately shorten the life of the battery but may be a worthwhile tradeoff in order to meet demand.

Heatmaps

According to another embodiment, heatmaps of energy demand on Pushpods may be generated to inform either live surge pricing (matching supply with demand) or inform how the Pushpod population needs to be re-distributed or increased in order to better serve the predicted localised demand. The system 100 is well equipped to do this as Pushpods require no installation and may be offered to convenience stores on a contract basis. Further this, data can be visualized based on the uploaded battery information 502 from batteries via the Pushpods 120-1. The heatmaps may be generated at the cloud service 141 and a graphic visualization overlaid on a map displayed on a user's smartphone 130 running a system specific application.

User Route Optimisation

By monitoring historical data of users' journeys, we can predict traffic flows. The goal is to place the Pushpods as conveniently as possible so users don't have to go out of their way to do a battery swap. Understanding where the volume of user journeys are informs the positioning of the Pushpods. This could be achieved using the battery tracking scheme shown in FIGS. 3 and 4 and described above. Alternatively, a dedicated record for a user 1412-1 could be adapted to provide tracking data showing where a user has travelled (linked, for example, to a cage 1411-7 in the inventory 1411).

Also, on an individual user basis, we can use historical journey data to predict where the user is travelling to. With this, we can pre-reserve a battery and push a low-battery notification via the cloud service 140 to the user's device 130. For example, the notification might read 'it seems like you're going to location X, a battery is on your way. Head for a swap'. For example, at step 401 of FIG. 4, such a prediction may be used to make the reservation request 401 automatically based on functionality provided by the application 130. Known route prediction algorithms may be employed in this regard and integrated into the application functionality.

Embodiments in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus, modules of apparatus (for example, a rendering device, printer or 3D printer) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 6:
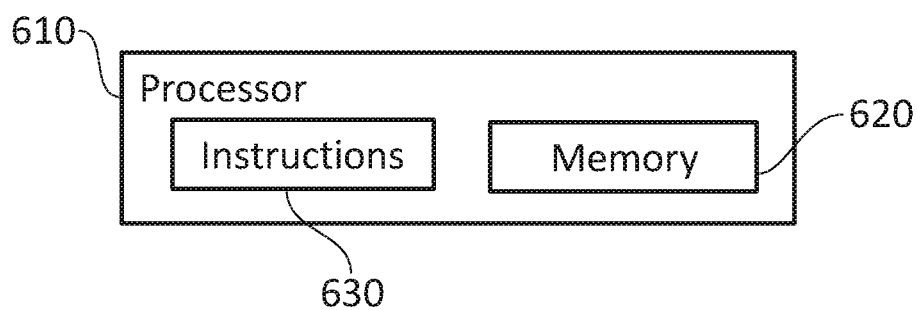
FIG. 6 is a schematic showing elements of a processor and memory according to an embodiment.

FIG. 6 shows an example of a processor 610 associated with a memory 620. The memory 620 comprises computer readable instructions 630 which are executable by the processor 610. The instructions 630 may include instructions to perform any of the computer implemented methods described herein.

Such machine readable instructions may also be loaded onto a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A cloud-connectable e-vehicle comprising:
a holster for receiving a battery;
wireless communication means; and
locking means for locking and unlocking the battery at the holster;
wherein the locking means is arranged to unlock the battery using an application for authorizing a permitted user to unlock the battery, wherein the authorization data is obtained using a cloud-based service, and wherein the vehicle is arranged to receive the authorization data from the cloud-based service via the wireless communication means.

2. An e-vehicle according to claim 1, wherein the application is configured to cause authorization data for unlocking the battery to be communicated to the vehicle.

3. An e-vehicle according to claim 1, wherein the wireless communication means includes at least one of a GSM, 3G, 4G, LTE, 5G, or Bluetooth transceiver module.

4. An e-vehicle according to claim 1, wherein the e-vehicle is a micro-mobility vehicle.

5. A system comprising:
a cloud-server; and
one or more e-vehicles according to claim 1,
wherein the cloud-server is configured to provide authorization data for unlocking a battery of one of said e-vehicles in response to a request from an application.

6. A system according to claim 5, wherein the request is from an application running on a portable device and includes data identifying a user.

7. A system according to claim 6 wherein the request includes data identifying an element of an e-vehicle from which a user requests unlocking of a battery.

8. A system according to claim 5, further comprising user equipment running the application, said user equipment being communicatively coupled to the cloud-server.

9. A system according to claim 5, wherein the cloud-server is configured to provide authorization data for unlocking the batter of one of said e-vehicles in response to a request from and application and in response to a confirmation that the e-vehicle location is sufficiently close to a battery swap location.

10. A system according to claim 5, wherein the cloud-server is configured to provide authorization to discharge the battery of one of said e-vehicles to the one of said e-vehicles.

11. An e-vehicle according to claim 1, wherein the authorization data is obtained in response to location data indicating that the e-vehicle is close to a battery swap station location.

12. An e-vehicle according to claim 1, wherein the e-vehicle is further arranged to receive authorization to discharge the battery from the cloud-based service via the wireless communication means.

13. A method comprising
requesting a battery to be unlocked from an e-vehicle using an application for authorizing a user to unlock the battery;
receiving, at a cloud-based server, the request to unlock the battery from the e-vehicle;
providing, by the cloud-based server and to wireless communication means of the e-vehicle authorization data if the user making the request is permitted to unlock the battery at the e-vehicle.

14. A method according to claim 13, wherein the application is running on a portable device.

15. A method according to claim 13, wherein the request includes data identifying the user and the micro-mobility vehicle from which the battery is to be unlocked.

16. A method according to claim 13, further comprising:
confirming, by the cloud-based server, that the e-vehicle location is close to a battery swap location;
wherein providing the authorization data includes:
providing, by the cloud-based server and to wireless communication means of the e-vehicle, authorization data if the user making the request is permitted to unlock the battery and in response to a confirmation that the e-vehicle location is close to a battery swap station location.

17. A method according to claim 13, further comprising:
providing, by the cloud-based server and to the wireless communication means of the e-vehicle, authorization to discharge the battery.

\* \* \* \* \*